May 13, 1958 F. N. MATTOX 2,834,632
CAMPING TRAILER

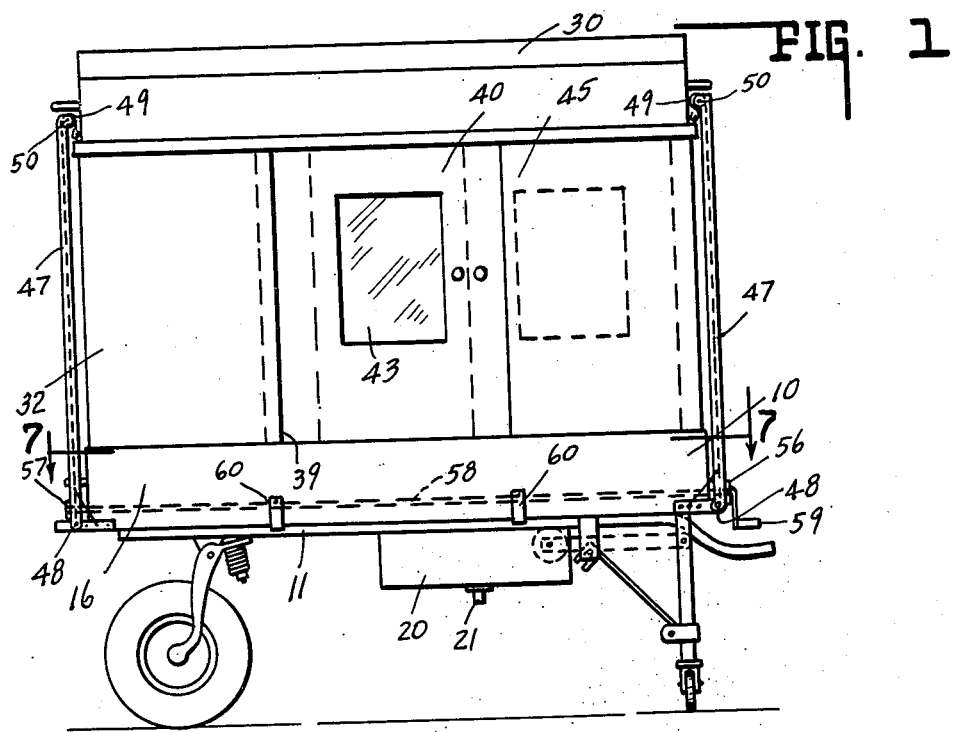
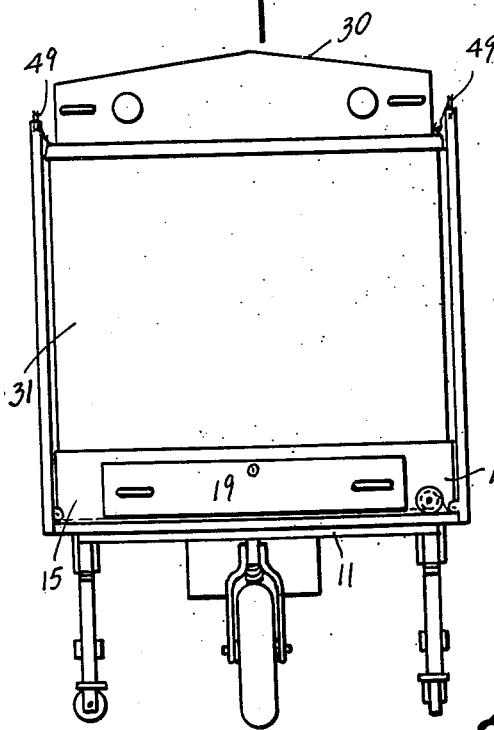
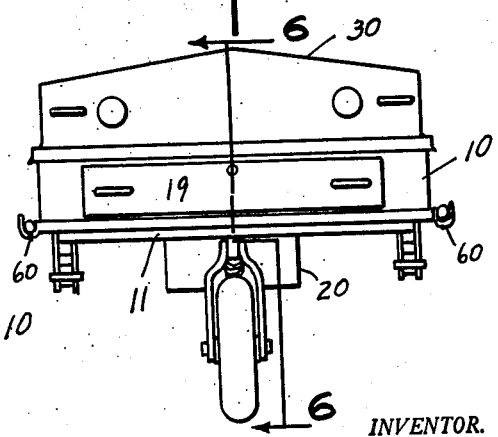

Filed Sept. 9, 1955 3 Sheets-Sheet 2

INVENTOR.
FRED N. MATTOX.
BY
Lockwood, Galt, Woodard & Smith
ATTORNEYS.

May 13, 1958
F. N. MATTOX
2,834,632
CAMPING TRAILER
Filed Sept. 9, 1955
3 Sheets—Sheet 3
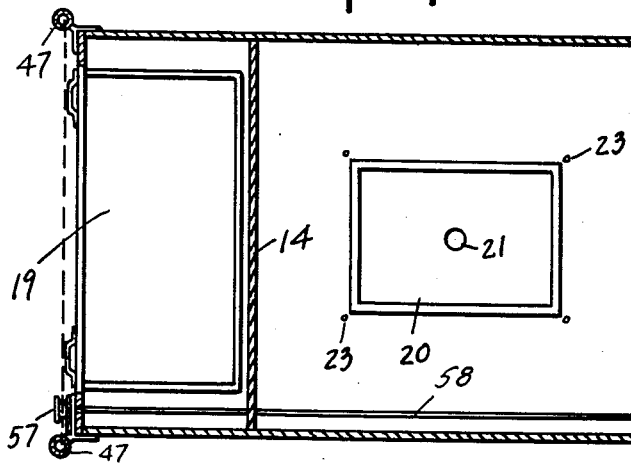
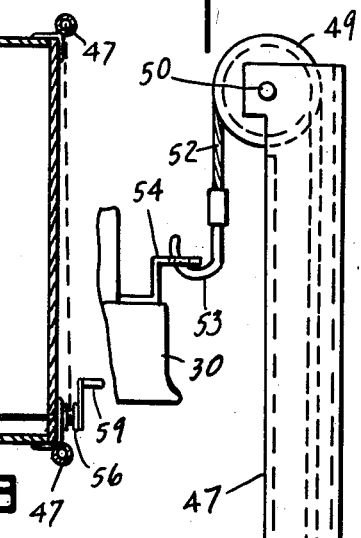
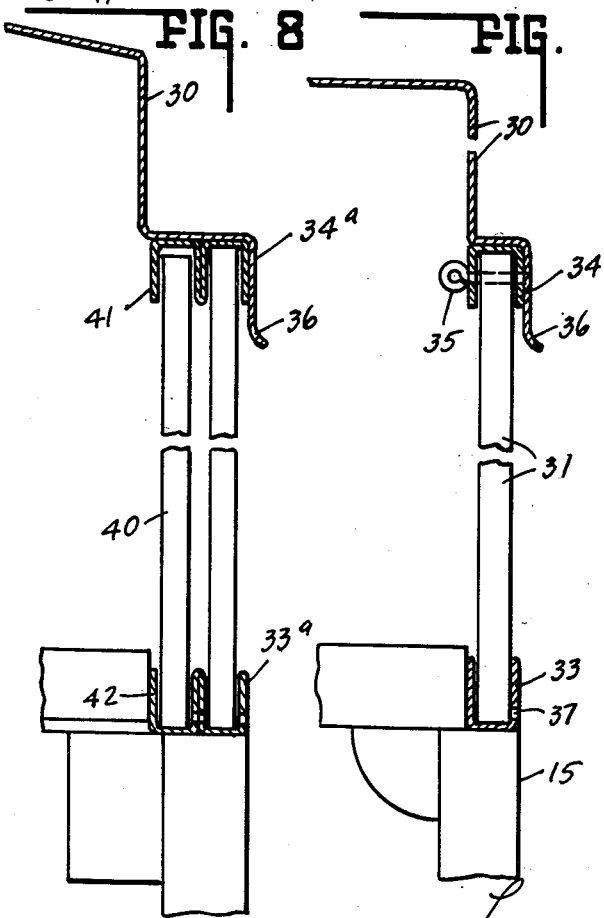
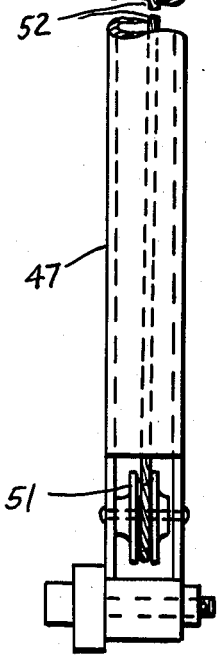
INVENTOR.
FRED N. MATTOX.
BY
Lockwood, Galt, Woodard & Smith
ATTORNEYS.

United States Patent Office 2,834,632
Patented May 13, 1958

2,834,632

CAMPING TRAILER

Fred N. Mattox, Indianapolis, Ind.

Application September 9, 1955, Serial No. 533,374

5 Claims. (Cl. 296—27)

This invention relates generally to outdoor camping equipment and more particularly it relates to a camping trailer adapted to be towed by an automobile.

The conventional house trailer for automobiles has been manufactured in many forms and sizes but in general the conventional house trailer is not adapted to be used in the wilder parts of the country where there are no hard surface roads and no parking areas specially built for such trailers. Also the conventional house trailer is relatively heavy and imposes a greater load than the conventional automobile is designed to handle.

In an effort to overcome these disadvantages the workers in the art have designed smaller and lighter collapsible trailers which may be collapsed for towing over a highway, and unfolded or erected at a camping site to provide living space. Trailers of this character usually include complex and heavy structure which is relatively difficult for one person to operate and relatively costly to manufacture.

The principal object of this invention is to provide a camping trailer of a collapsible nature but of such relatively simple construction that it is light in weight, economical to manufacture and easily collapsed and erected by a single person.

In accordance with this invention there is provided a camping trailer comprising a bed structure adapted to be mounted on a trailer chassis, a roof structure normally attached to said bed, end panels carrying partial side panels attached thereto and adapted to be mounted on said bed structure to support the roof in spaced relation thereto to form living space, and side doors adapted to be mounted between said partial side panels in sliding relation thereto for closing the side panels or providing access to the interior of said trailer.

The full nature of the invention will be understood from the accompanying drawings and the following description and claims:

Fig. 1 is a side elevation view of the camping trailer as provided in accordance with this invention.

Fig. 2 is an end elevation.

Fig. 4 is an end elevation of the trailer in collapsed condition.

Fig. 7 is a cross section taken on line 7—7 of Fig. 1.

Fig. 8 is an enlarged detailed view partially in cross section of the side panel and door supporting structure for the device illustrated in Fig. 1.

Fig. 9 is an enlarged detailed view partially in cross section of the supporting structure for the end panel shown in Fig. 2, and Fig. 10 is an enlarged side elevation view of the hoisting apparatus illustrated in Fig. 1.

Figure 3:
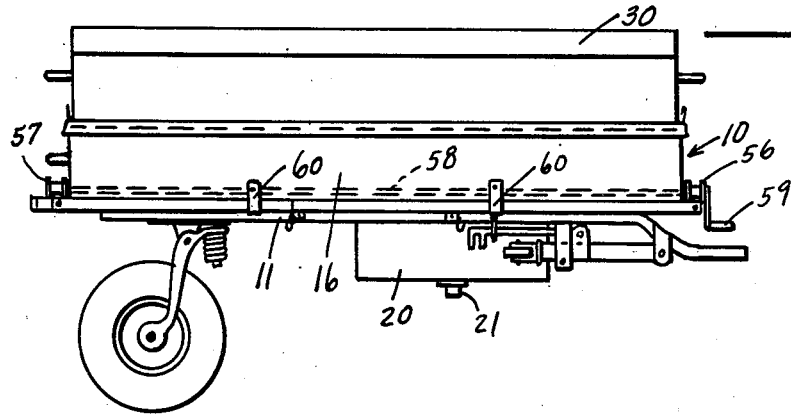
Fig. 3 is a side elevation illustrating trailer in collapsed condition.
Figure 5:
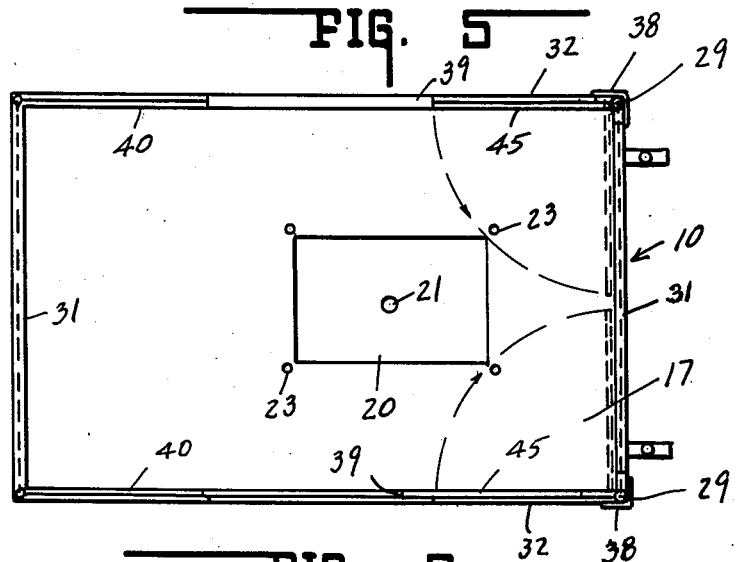
Fig. 5 is a top plan view of the apparatus illustrated in Fig. 1 with the roof and hoisting apparatus removed.
Figure 6:
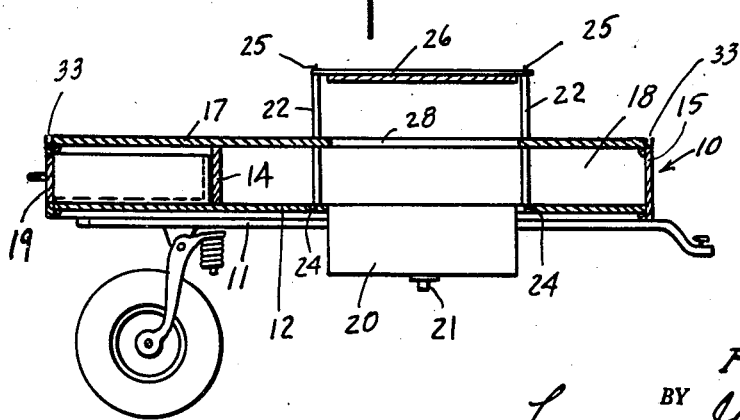
Fig. 6 is a longitudinal cross section taken on line 6—6 of Fig. 4.

Referring to the drawings, the trailer provided in accordance with this invention comprises a bed 10 adapted to be mounted on a chassis 11 of a conventional one-wheel or two-wheel trailer. The bed 10 may comprise a lower floor 12 which may be bolted or otherwise fastened to chassis 11. A dividing partition 14 and end panels 15, together with side panels 16, may be mounted on the floor 12 for supporting an upper floor section 17 thereby to provide a storage space 18 for cooking utensils, supplies, and the like. A drawer space is also formed for receiving a drawer 19 in which clothing or other duffel may be stored.

The bottom floor 12 may also be provided with a metallic pan 20 having a drain 21 thereby to provide a sink or dropped floor for providing leg room when a person sits on floor 17. In order to have a table within the trailer a plurality of legs 22 may be erected on the bottom floor 12 through holes 23 in the upper floor 17. The lower ends of the legs 22 may have pins 24 which may be inserted in suitable holes in floor 12 and pins 25 may be provided in the upper ends of legs 22 for receiving a table member 26. The top floor section 17 is provided with an opening 28 to supply leg room beneath the table member 26. In order to close this hole, the legs 22 may be removed and the table member may be dropped over hole 28 thereby to provide a complete top floor area.

A metallic roof member may be supported on the bed 10 by means of end panels 31 having partial side panels 32 attached thereto by means of hinges 29. The lower end of the end panel 31 may be supported on the end panel 15 of body 10 by means of an upwardly facing channel member 33 mounted on the upper edge of panel 15. The roof 30 may include a downwardly facing channel 34 for receiving the upper edge of panel 31. End panels 31 may be secured to channels 33 and 34 by means of anchor pins such as 35.

The roof 30 may be provided with eaves 36 which extend downwardly over channel 34 to prevent water leakage. For this same purpose angle-iron members 38 may be fastened to end panels 31 to overlap the hinged edges of panels 32. The channel 33 is provided with drain holes 37 to prevent water leakage on floor 17.

The partial side panels 32 are held in position by means of channel members 33a and 34a attached to side panel 16 and the roof 30 respectively and which are similar in all respects to channels 33 and 34, respectively. Because of the right-angle relationship of panels 31 and 32, the roof may be supported relatively rigidly on the bed 10.

The partial side panels 32 leave a door opening 39 on each side of the trailer. Doors 40 may be supported in channels 41 and 42 mounted beneath the roof 30, as shown, and on top of side panels 16, respectively. The doors 40 are provided with glass windows 43 whereby the doors serve to prevent snow or rain from blowing into the trailer. In fair weather, it is desirable that there be circulation of air within the trailer and, therefore, screen doors 45 are also slidably supported within the channels 41 and 42. By sliding both doors to the extreme left (Figure 1) screen door 41 will close the opening 39. Alternatively, by sliding the doors to the extreme right (Figure 1) the storm door will close opening 39 as illustrated in Figure 1.

While the structure described herein may be erected by first erecting the end and side panels and then dropping the roof thereon, it is contemplated in accordance with this invention to provide hoisting apparatus consisting of pipe members 47 mounted at each corner of the bed 10 on hinge members 48. An upper pulley 49 may be rotatably mounted on a pin 50 and a lower pulley 51 may be mounted adjacent the lower end of pipe 47 for receiving a rope 52 having a hook 53 adapted to be hooked into an eye 54, one of which may be secured to each corner of the roof member 30. For hoisting the roof 30 by means of rope 52, there is provided a winch having a first drum 56 and a second drum 57 mounted on shaft 58 which in turn may be rotatably mounted in end panels 15 as shown in Figures 1 and 2. The ropes 52 at the front end of the trailer may be wound on drum 56 while the ropes 52 at the rear end of the trailer may be wound on the drum 57.

Thus, by utilizing the handle 59 to rotate the winch, top 30 may be raised to permit the end panels 31 and side panels 32 to be mounted in the bottom channel members 33 and 33a. Simultaneously, the door members 40 and 45 may be placed within the channel members 42 and then the roof 30 may be lowered to engage the channels 34, 34a, and 41 over the upper edges of the panels and doors respectively. The winch may have a ratchet and pawl mechanism (not shown) for holding the top in its uppermost position whereby a single person may erect the panels and then lower the top as described.

When it is desired to collapse the trailer, the roof may be lifted by means of the winch to free the upper edges of the panels and doors. Since each end panel 31 is hinged to the partial panels 32 they may be removed from the channels 33 and 33a, folded together to form a flat package, and stored on the top floor section 17. The doors may be similarly stored and the roof 30 may be lowered into the position shown in Figures 3 and 4. The channels 34 and 34a come to rest on the channels 33 and 33a with the eaves 36 extending downwardly over the end and side panels 15 and 16 of the body 10. The pipe members 47 may be lowered on hinges 48 along the side panels 16 of body 10 for support in the hooks 60 as shown in Figures 3 and 4.

From the foregoing description it will be apparent that this invention provides a collapsible camping trailer having a minimum number of pieces of extremely light weight. For example, the trailer body may be built of relatively thin plywood and the top, together with the panels and doors, may be built of sheet aluminum. When the trailer is collapsed as shown in Figures 3 and 4, it is low enough that it does not obstruct the rear vision of an automobile driver thereby adding to driving safety. Also, the trailer provides storage space for supplies and duffel.

What is claimed is:

1. A collapsible camping trailer comprising a body having a floor adapted to be attached to a trailer chassis and a second floor spaced therefrom to provide storage space, upwardly facing end and side channels mounted around the outer edges of said second floor, end panels mounted in the end channels, each end panel having hinged thereto a pair of partial side panels mounted in the side channels, said partial side panels being spaced from one another to form a door space on each side of said body, a roof including downwardly facing channel members fitting over the upper edges of said panels to lock them in upright position, columns hingedly mounted at each corner of said body and including hoisting apparatus attached to said roof for lifting or lowering said roof with respect to said body, and a winch having a drum at each end of said body cooperating with said hoisting apparatus whereby said panels may be erected or collapsed with respect to said body.

2. A collapsible camping trailer comprising a body having a floor, upwardly facing end and side channels mounted around the outer edges of said floor, end panels mounted in the end channels, partial side panels mounted in the side channels, said partial side panels being spaced from one another to form a door space on each side of said body, a roof including downwardly facing channel members fitting over the upper edges of said panels to lock them in upright position, hoisting apparatus mounted on said body and attached to said roof for lifting or lowering said roof with respect to said body, and a winch cooperating with said hoisting apparatus, whereby said panels may be erected or collapsed with respect to said body.

3. A collapsible camping trailer comprising a body having a floor adapted to be attached to a trailer chassis and a second floor spaced therefrom to provide storage space, upwardly facing end and side channels mounted around the outer edges of said second floor, end panels mounted in the end channels, each end panel having hinged thereto a pair of partial side panels mounted in the side channels, said partial side panels being spaced from one another to form a door space on each side of said body, a roof including downwardly facing channel members fitting over the upper edges of said panels to lock them in upright position, and columns hingedly mounted at each corner of said body and including hoisting apparatus attached to said roof for lifting or lowering said roof with respect to said body whereby said panels may be erected or collapsed with respect to said body.

4. A collapsible camping trailer comprising a bed adapted to be attached to a trailer chassis, upwardly facing end and side channels mounted around the outer edges of said bed, end panels mounted in the end channels, partial side panels mounted in the side channels and spaced from one another to form a door space on each side of said bed, a roof including downwardly facing channel members fitting over the upper edges of said panels to lock them in upright position, and doors slidably mounted between said bed and said roof for closing said door spaces.

5. A collapsible camping trailer comprising a body, upwardly facing end and side channels mounted around the outer edges of said body, end panels mounted in the end channels, each end panel having hinged thereto a pair of partial side panels mounted in the side channels, said partial side panels being spaced from one another to form a door space on each side of said body, and a roof including downwardly facing channel members fitting the upper edges of said panels to lock them in upright position.

References Cited in the file of this patent

UNITED STATES PATENTS

| | | |
|---|---|---|
| 1,852,984 | Smith | Apr. 5, 1932 |
| 1,861,906 | Bradburn | June 7, 1932 |
| 1,917,824 | Burns | July 11, 1933 |
| 1,998,937 | McGinnis | Apr. 23, 1935 |
| 2,055,930 | Josephs | Sept. 29, 1936 |
| 2,152,713 | Stewart | Apr. 4, 1939 |
| 2,323,106 | Whiteman | June 29, 1943 |